US008758671B2

(12) United States Patent
Murtagh et al.

(10) Patent No.: US 8,758,671 B2
(45) Date of Patent: Jun. 24, 2014

(54) CONTROL OF CLAY CRYSTALLITE SIZE FOR THERMAL EXPANSION MANAGEMENT (75) Inventors: Martin Joseph Murtagh, Trumansburg, NY (US); Bryan Ray Wheaton, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 157 days.

(21) Appl. No.: 13/459,771

(22) Filed: Apr. 30, 2012

(65) Prior Publication Data
US 2013/0288881 A1    Oct. 31, 2013

(51) Int. Cl.
*C04B 33/00* (2006.01)
*C04B 33/24* (2006.01)
*B28B 1/00* (2006.01)
*B28B 3/00* (2006.01)

(52) U.S. Cl.
USPC ........... 264/609; 264/679; 264/680; 501/141; 501/144

(58) Field of Classification Search
USPC .......... 501/141, 144; 264/430, 434, 603, 609, 264/679, 680
See application file for complete search history.

(56) References Cited

U.S. PATENT DOCUMENTS

| 4,001,028 | A | 1/1977 | Frost et al. ............... 106/62 |
| 5,911,941 | A * | 6/1999 | Rokhvarger et al. ........ 264/432 |
| 5,916,511 | A | 6/1999 | Kotani et al. ............... 264/631 |
| 6,203,882 | B1 | 3/2001 | Koike et al. ............... 428/116 |
| 7,404,840 | B2 * | 7/2008 | Wood et al. ............... 55/523 |
| 7,481,962 | B2 | 1/2009 | Kotani et al. ............... 264/631 |
| 8,058,198 | B2 | 11/2011 | Yamazaki et al. ............. 501/118 |

| 2005/0171265 | A1 * | 8/2005 | Bortnick et al. ............... 524/445 |
| 2005/0221053 | A1 | 10/2005 | Tomita et al. ............... 428/116 |
| 2009/0298670 | A1 | 12/2009 | Murtagh et al. ............... 501/80 |
| 2010/0304082 | A1 | 12/2010 | Merkel ........................ 428/116 |
| 2013/0116110 | A1 | 5/2013 | Bronfenbrenner et al. ... 501/141 |

FOREIGN PATENT DOCUMENTS

EP    0506301    9/1992

OTHER PUBLICATIONS

Cozzi et al. Crystallite size of kaolinites as indicator of different geochemical types of bauxite. Z Kristallogr Suppl. 30 (2009) 441-446.*
P. De Souza Santos, "The use of clay particle morphology studies to characterize industrial clay deposits: examples from Brazil", Clay Minerals, 1993, 28, 539-553.
G. Cozzi et al., "Crystallize size of kaolinites as indicator of different geochemical types of bauxite", Z. Kristallogr. Suppl., 2009, 30, 441-446.
Sucha V. et al, Crystallite Size Distribution of Kaolin Minerals, Per. Mineral 68 (1) 81-92 1999.
U.S. Appl. No. 13/459,827, filed Apr. 30, 2012, "Control of Clay Crystallite Size for Shrinkage Management".
Ji Langford and AJC Wilson, Scherrer after sixty years: a survey and some new results in the determination of crystalline size, J. Appl. Cryst. 11 (1978) pp. 102-113.

* cited by examiner

*Primary Examiner* — Noah Wiese
(74) *Attorney, Agent, or Firm* — Charles A. Greene; Matthew J. Mason (57) ABSTRACT A method of making ceramic articles includes compounding ceramic precursor batch components that include hydrous clay. The hydrous clay includes particle components having a platy geometry. The crystallite size of the platy hydrous clay particle components is less than a predetermined amount. Controlling such crystallite size can result in fired ceramic articles with a lower coefficient of thermal expansion and improved thermal shock resistance.

17 Claims, 5 Drawing Sheets

CONTROL OF CLAY CRYSTALLITE SIZE FOR THERMAL EXPANSION MANAGEMENT

BACKGROUND

The disclosure relates generally to hydrous clay containing green monoliths and more specifically to hydrous clay containing green monoliths that can exhibit improved thermal expansion characteristics.

In the formation of ceramic bodies, e.g., silicon carbide, cordierite, mullite, alumina, or aluminum titanate bodies, green monoliths are typically fired at high temperatures for an extended period of time. During firing, the green bodies experience one or more phase changing events. For example, during the firing of hydrous kaolin containing green monoliths, the bodies interact with magnesia containing minerals, i.e. talc ($3MgO4SiO_2H_2O$), brucite ($Mg(OH)_2$), magnesite $MgCO_3$, to form cordierite ($2MgO2Al_2O_35SiO_2$). During a time (and temperature) in the firing cycle that corresponds to a kaolin dehydroxylation and sintering event, a preferred orientation and grain size coursing (domains) develops, which can correlate to a given coefficient of thermal expansion (CTE) in the fired ceramic body.

Various methods have been employed to control the CTE of such hydrous clay containing green monoliths. One method, such as that described in U.S. Pat. No. 8,058,198 B2 involves controlling the amount of hydrous kaolin and the kaolin crystallinity (as measure by the XRD Hinckely index method) in the batch composition. However, reducing the amount of hydrous clay can lead to certain potential disadvantages, such as creating a less plastic batch material that is more difficult to extrude and/or undesirable changes with respect to the properties of the fired ceramic body. In addition, the crystallinity, as measured by XRD Hinckley index method, describes the order/disorder of the kaolin (i.e. it does not differentiate crystallographic directions).

Other methods have involved characterizing the clay morphology using an analytical technique, correlating such characterization with a desired characteristic, and then selecting clay that will help enable the resulting composition to exhibit the desired characteristic. For example, U.S. Pat. No. 7,481,962, discloses an analytical technique for determining a clay "cleavage index" and then setting a limit on that index for clay used in a composite batch composition.

SUMMARY

One embodiment of the disclosure relates to a method of making a ceramic article. The method includes compounding ceramic precursor batch components. The ceramic precursor batch components include hydrous clay, wherein the hydrous clay includes particle components having a platy geometry, wherein the crystallite size of the particle components having a platy geometry is less than a predetermined amount.

Another embodiment of the disclosure relates to a ceramic precursor batch composition. The ceramic precursor batch composition includes ceramic precursor batch components. The ceramic precursor batch components include hydrous clay, wherein the hydrous clay includes particle components having a platy geometry, wherein the crystallite size of the particle components having a platy geometry is less than a predetermined amount.

Another embodiment of the disclosure relates to a green cellular ceramic body. The green cellular ceramic body includes ceramic precursor batch components. The ceramic precursor batch components include hydrous clay, wherein the hydrous clay includes particle components having a platy geometry, wherein the crystallite size of the particle components having a platy geometry is less than a predetermined amount.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Various embodiments of the disclosure will be described in detail with reference to the drawings, if any.

As used herein, the term "platy geometry" refers to the geometry of hydrous clay components having dimensions extending in the x, y, and z directions of a Cartesian coordinate system, wherein the z direction is the shortest of the three dimensions to which the hydrous clay components extend and is also referred to herein as the "basal plane direction."

Figure 1:
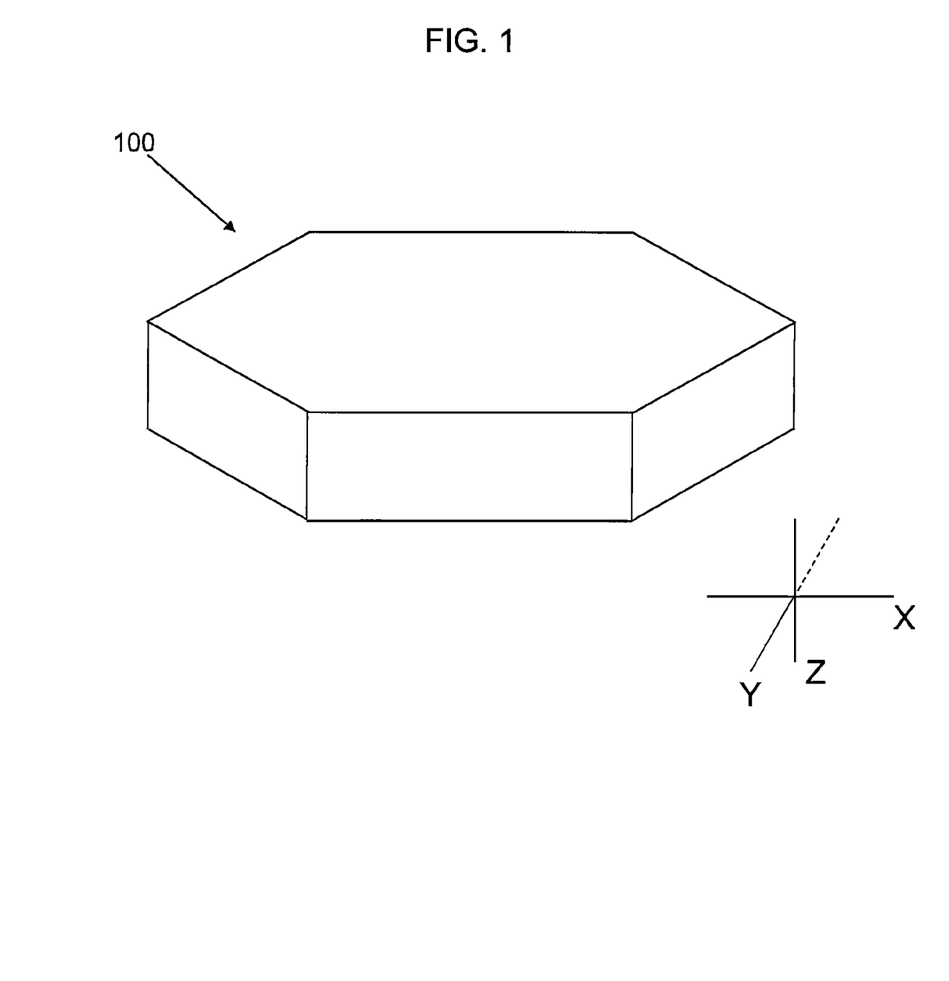
FIG. 1 illustrates a representation of a hydrous clay component having a platy geometry.

A representation of a hydrous clay component having a platy geometry is illustrated in FIG. 1. Hydrous clay component 100 extends in the x, y, and z directions, wherein the z direction is the basal plane direction. As used herein, the shortest dimension that the hydrous clay component extends in the basal plane direction is referred to as the "crystallite size" of the hydrous clay component.

Figure 2A:
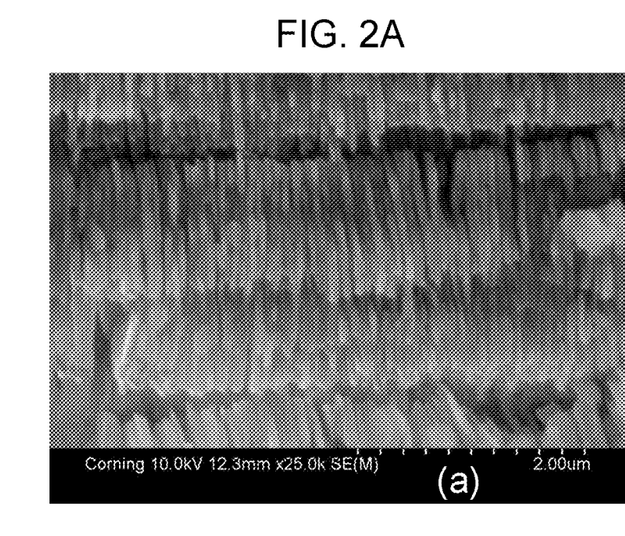
FIGS. 2A-B show field emission scanning electron microscopy (FESEM) images of hydrous clays having hydrous clay components of varying crystallite size.
Figure 2B:
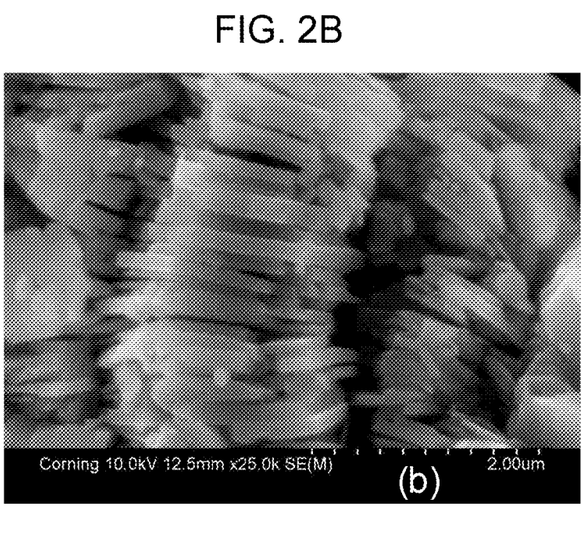

FIGS. 2A and 2B show SEM images of two selected hydrous clays showing hydrous clay particle components having a platy geometry with varying crystallite sizes. The hydrous clay shown in FIG. 2A has particle components having a crystallite size that are less than the crystallite size of the particle components of the hydrous clay shown in FIG. 2B.

In contrast to other efforts, such as those described in U.S. Pat. No. 7,481,962, which focus on the overall shape of kaolin clay particles, the present application focuses on the crystallite size of clay particle components. Applicants have surprisingly found that the crystallite size of clay particle components correlates well to the coefficient of thermal expansion (CTE) upon firing, particularly during post dehydroxylation, whereas methods that focus on the overall shape of clay particles (such as those that focus on using the Hinckley crystallinity index) do not correlate as well to CTE. Minimizing CTE helps to overcome certain problems that can occur in the final ceramic article, such as unsuitable thermal shock resistance. In that regard, methods disclosed herein can enable an accurate selective characterization of kaolin hydrous clay to determine the suitability of the clay to produce a robust thermal shock resistant ceramic article, which can, in turn, enable greater product throughput and greater manufacturing asset utilization.

The crystallite size of clay particle components having a platy geometry as described herein and as observed by FESEM imaging was determined quantitatively by X-ray diffraction measurements of the peak broadening associated with the 00 l basal-plane, specifically the (002), reflections. The full width at half maximum (FWHM) was calculated utilizing pseudo-Voight profiles and linear background on standard back-loaded kaolinite powders with the use of MDI Jade profile fitting software. The calculation of the crystallite size is based on the Scherrer (1,2) equation, where XRD peak width is inversely proportional to the crystallite size.

The crystallite size of the clay particle components having a platy geometry should be less than a predetermined amount. In certain exemplary embodiments, the crystallite size of the clay particle components is less than 66 nanometers, such as less than 60 nanometers, and further such as less than 50 nanometers, and still yet further such as less than 40 nanometers. The crystallite size of the clay particle components may, for example, be from 20 nanometers to 66 nanometers, such as from 20 nanometers to 50 nanometers, and further such as from 20 nanometers to 40 nanometers.

In certain exemplary embodiments, the hydrous clay consists essentially of particle components having a platy geometry, wherein the crystallite size of the particle components having a platy geometry is less than the predetermined amount. In certain exemplary embodiments, the hydrous clay consists essentially of particle components having a crystallite size that is less than 66 nanometers, such as less than 60 nanometers, and further such as less than 50 nanometers, and still yet further such as less than 40 nanometers.

In certain exemplary embodiments, at least 90%, such as at least 95% of the hydrous clay particle components have a platy geometry, wherein the crystallite size of the particle components having a platy geometry is less than the predetermined amount. In certain exemplary embodiments, essentially all of the hydrous clay particle components have a platy geometry, wherein the crystallite size of the particle components having a platy geometry is less than the predetermined amount. The predetermined amount can, for example, be less than 66 nanometers.

The hydrous clay can be compounded with other ceramic precursor batch components. Such components may be synthetically produced materials such as oxides, hydroxides, etc., or they may be naturally occurring minerals such as clays (in addition to the hydrous clay), talcs, or any combination of these. Embodiments disclosed herein are not limited to the types of powders or raw materials used as the other ceramic precursor batch components. These may be chosen depending on the properties desired in the ceramic body.

In certain exemplary embodiments, the ceramic precursor batch components comprise at least 10% hydrous clay by weight, such as at least 15% hydrous clay by weight, and further such as at least 20% hydrous clay by weight. For example, the ceramic precursor batch components may, in certain embodiments, comprise from about 10% to about 20% hydrous clay by weight.

In one set of exemplary embodiments, the inorganic ceramic-forming ingredients may yield a cordierite ceramic material upon firing. In other exemplary embodiments, the inorganic ceramic-forming ingredients may be those that yield cordierite-mullite mixtures, some examples of such mixtures being about 2% to about 6% mullite, and about 93% to about 99% cordierite, with allowance for other phases, typically up to about 10% by weight.

One composition, by way of a non-limiting example, which ultimately forms cordierite upon firing is as follows in percent by weight: about 10-20, such as about 12-18 of hydrous clay, about 15-25, such as about 18-22 of calcined clay, about 35-45, such as about 38-42 of talc, about 5-15, such as about 8-12 of alumina, and about 5-15, such as about 8-12 of silica.

In certain exemplary embodiments, methods disclosed herein include determining the crystallite size of hydrous clay particle components having a platy geometry prior to compounding the clay with other ceramic precursor batch components. In such methods, if the crystallite size of the particle components having a platy geometry is determined to be above a predetermined amount, additional particle components having a platy geometry and a crystallite size that is some amount lower than the predetermined amount can be compounded into the composition, such that, collectively, the particle components having a platy geometry have a crystallite size that is less than a predetermined amount.

For example, if the predetermined amount of crystallite size of the hydrous clay particle components is 66 nanometers, and a crystallite size of hydrous clay particle components of a tested amount or lot of hydrous clay is 75 nanometers, such clay can be compounded with an amount hydrous clay from a different lot having a crystallite size of below 66 nanometers (for example, 50 nanometers) such that the resulting combined amounts from both lots have a crystallite size of below 66 nanometers.

In certain exemplary embodiments, the ceramic precursor batch composition comprises one or more organic ceramic-forming ingredients, such as ingredients that can be used as binders, lubricants and/or surfactants. Examples of binders include cellulose-based polymers, such as hydroxypropyl methylcellulose (HPMC). Examples of lubricants/surfactants include natural or synthetic oils, silicone-based materials, $C_8$ to $C_{22}$ fatty acids (and their salts), $C_8$ to $C_{22}$ fatty alcohols, and $C_8$ to $C_{22}$ fatty esters.

Typically, the amount of binder may be from about 1% to about 10% by weight, such as from about 2% to about 5% by weight, on a weight percent by super addition basis. Typically, the amount of lubricants or surfactants may be from about 1% by weight to about 10% by weight, such as from about 3% to about 6% by weight, on a weight percent by super addition basis.

Compositions disclosed herein can also include at least one solvent. The solvent may provide a medium for the binder to dissolve in thus providing plasticity to the ceramic precursor batch and wetting of the powders. The solvent may be aqueous based such as, but not limited to, water or water-miscible solvents. Most useful may be aqueous based solvents which provide hydration of the binder and powder particles. Typically, the amount of aqueous solvent may be from about 10% by weight to about 50% by weight, on a weight percent by super addition basis.

Non-limiting examples of oil lubricants may be light mineral oil, corn oil, high molecular weight polybutenes, polyol esters, a blend of light mineral oil and wax emulsion, a blend of paraffin wax in corn oil, and combinations of these. Typically, the amount of oil lubricants may be from about 1% by weight to about 10% by weight, on a weight percent by super addition basis. In an exemplary embodiment, the oil lubricants may be present from about 3% by weight to about 6% by weight, on a weight percent by super addition basis.

In filter applications, such as in diesel particulate filters, it may be desirable to include a pore forming material in the mixture in an amount effective to subsequently obtain the porosity required for efficient filtering. Examples of pore forming materials include particulate substances (not binders) that burn out of the green body in the firing step. Other pore forming materials do not burn out in the firing step. Some types of pore forming materials that may be used, although it is to be understood that embodiments herein are not limited to these, include non-waxy organics that are solid at room temperature, elemental carbon, and combinations of these. Some examples may be graphite, starch, cellulose, flour, etc. In one exemplary embodiment, the pore forming material may be elemental carbon. In another exemplary embodiment, the pore forming material may be graphite, which may have the least adverse effect on the processing. In an extrusion process, for example, the rheology of the mixture may be good when graphite is used. The pore forming material may be up to about 60% by weight as a superaddition. Typically, the amount of graphite may be from about 1% to about 50%, such as from about 3% to about 30% by weight based on the inorganic ceramic-forming ingredients. If a combination of graphite and flour are used, the amount of pore forming material may be typically from about 1% by weight to about 25% by weight with the graphite at 5% by weight to 10% of each and the flour at 5% by weight to about 10% by weight.

The disclosure also provides a method of producing a ceramic article, comprising the steps of compounding ceramic precursor batch components, including hydrous clay, wherein the hydrous clay comprises particle components having a platy geometry, wherein the crystallite size of the particle components having a platy geometry is less than a predetermined amount. The ingredients may be compounded by being mixed, for example, in a muller or plow blade mixer. A solvent may be added in an amount that is less than is needed to plasticize the batch. With water as the solvent, the water hydrates the binder and the powder particles. The surfactant and/or lubricant, if desired, may then be added to the mix to wet out the binder and powder particles.

The precursor batch may then be plasticized by shearing the wet mix formed above in any suitable mixer in which the batch will be plasticized, such as, but not limited to, a twin-screw extruder/mixer, auger mixer, muller mixer, or double arm, etc. Extent of plasticization is dependent on the concentration of the components (binder, solvent, surfactant, oil lubricant and the inorganics), temperature of the components, the amount of work put in to the batch, the shear rate, and extrusion velocity. During plasticization, the binder dissolves in the solvent and a high viscosity fluid phase is formed. The binder formed is stiff because the system is very solvent-deficient. The surfactant enables the binder phase to adhere to the powder particles.

In a further step, the composition may be extruded to form a green honeycomb body. Extrusion may be done with devices that provide low to moderate shear. For example hydraulic ram extrusion press or two stage de-airing single auger are low shear devices. A single or twin screw extruder is a moderate shear device. The extrusion may be vertical or horizontal.

It will be appreciated that honeycomb bodies disclosed herein may have any convenient size and shape and the disclosed embodiments are applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities range from about 235 cells/cm$^2$ (1500 cells/in$^2$) to about 15 cells/cm$^2$ (100 cells/in$^2$) and wall thicknesses from 0.025 mm (1 mil) to about 0.5 mm (20 mils). Methods disclosed herein may be especially suited for extruding thin wall/high cell density honeycombs, such as honeycombs having wall thicknesses less than 0.1 mm (4 mils), including less than 0.075 mm (3 mils), and further less than 0.05 mm (2 mils).

The extrudates may then be dried and fired according to known techniques. The firing conditions of temperature and time may depend on the composition and size and geometry of the body, and embodiments herein are not limited to specific firing temperatures and times. For example, in compositions which are primarily for forming cordierite, the top firing temperatures may typically be from about 1350° C. to about 1450° C., and the holding times at these temperatures may be from about 1 hour to about 6 hours. For cordierite-mullite forming mixtures which yield the previously described cordierite-mullite compositions, the top firing temperatures may be from about 1375° C. to about 1425° C. Firing times depend on factors such as kinds and amounts of materials and nature of equipment but typical total firing times may be from about 20 hours to about 100 hours.

Figure 3:
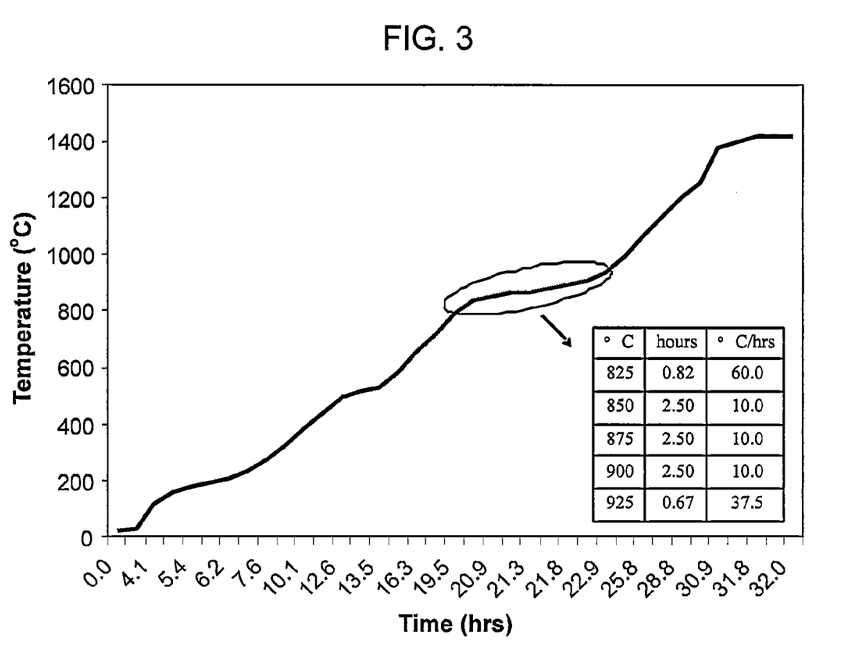
FIG. 3 plots a portion of an exemplary firing schedule that may be used to fire a ceramic article as described herein.

Prior to reaching the top firing temperature, the temperature of the firing environment is typically adjusted according to a predetermined firing schedule. A portion of an exemplary firing schedule is shown in FIG. 3. Such firing schedules, in exemplary embodiments, includes those in which the temperature of the firing environment is increased from 800° C. to 1,000° C. at an average rate of no greater than 15° C. per hour, such as an average rate of from 10 to 15° C. per hour. Increasing the temperature at this rate in this temperature range can help influence the resulting ceramic body to exhibit a desired CTE.

Embodiments disclosed herein can result in a ceramic article exhibiting a coefficient of thermal expansion (23° C. to 800° C.) of less than 4.7×10$^{-7}$/° C., such as less than 4.5×10$^{-7}$/° C., and further such as less than 4.0×10$^{-7}$/° C., and still further such as less than 3.5×10$^{-7}$/° C., and still yet further such as less than 3.0×10$^{-7}$/° C., including less than 2.5×10$^{-7}$/° C., and including from 2.0×10$^{-7}$/° C. to 4.7×10$^{-7}$/° C.

The disclosure and scope of the appended claims will be further clarified by the following example.

EXAMPLE

A series of green cordierite bodies were extruded from ceramic precursor batches. Each ceramic precursor batch included hydrous clay (12-20%) and cordierite forming raw ingredients such as talc, calcined clay, and alumina in appropriate formulation to yield stoichiometric cordierite in a fired body, as well as extrusion aides such as binders and lubricants. Water was added to the homogeneous mixture of the raw materials, producing a batch which was kneaded and extruded through a cellular honeycomb die.

Each green body had the same amount of each ingredient. The only difference between the batch ingredients was the crystallite size of the particle components of the hydrous clay, which ranged from between about 39 nanometers to about 90 nanometers and was measured using the X-ray powder diffraction method described previously.

Figure 4:
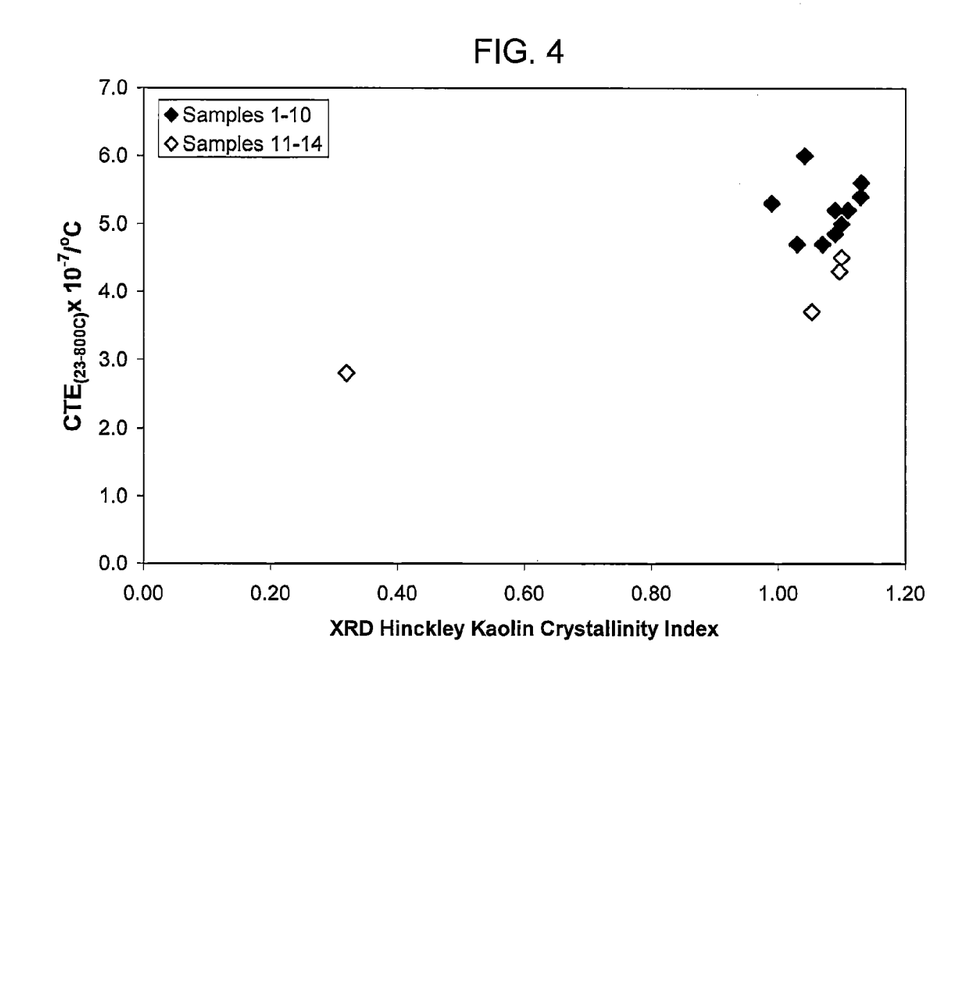
FIG. 4 plots CTE (23° C. to 800° C.) of fired ceramic articles as a function of the Hinkley Index of hydrous clay components having a platy geometry, which were used as batch components to make the fired ceramic articles.
Figure 5:
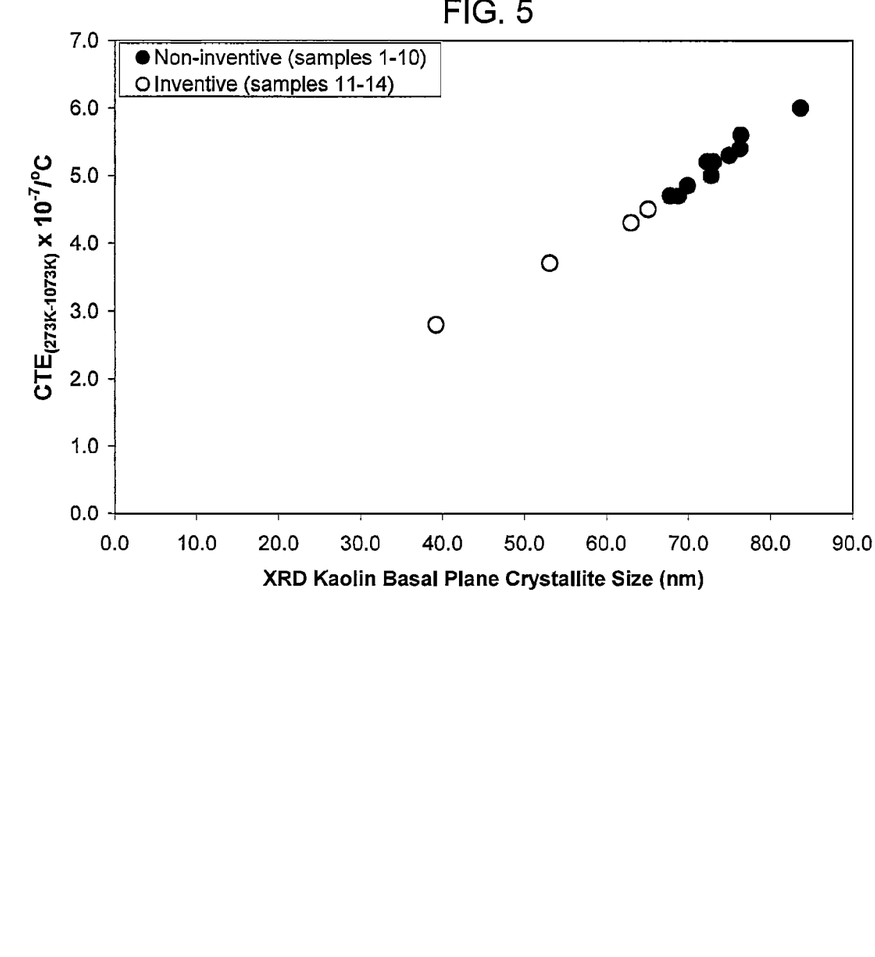
FIG. 5 plots CTE (23° C. to 800° C.) of fired ceramic articles as a function of crystallite size of hydrous clay components having a platy geometry, which were used as batch components to make the fired ceramic articles.

Following extrusion, the material was dried in an oven and then fired according to the exemplary firing schedule shown in FIG. 3 after which a sample was cut from the fired body and run in a dilatometer. Dilatometer data for exemplary samples with a range of crystallite sizes and corresponding CTEs are set forth in Table 1 and plotted in FIGS. 4 and 5 as a function of Hinckley index and crystallite size of hydrous clay components in the basal plane, respectively. Table 1 also sets forth the median particle diameter of the hydrous clay components (expressed in microns as d50). As can be seen from Table 1 and FIGS. 4 and 5, CTE correlated much more strongly to the crystallite size of hydrous clay components in the basal plane than it did to any other measured characteristic of the hydrous clay.

TABLE 1

| Sample | d50 (µm) | Hinckley Index | Crystallite size (nm) | CTE ($\times 10^{-7}/°$ C.) |
|---|---|---|---|---|
| 1 | 2.9 | 1.04 | 83.7 | 6.0 |
| 2 | 3.0 | 1.13 | 76.4 | 5.6 |
| 3 | 3.0 | 1.08 | 76.3 | 5.4 |
| 4 | — | 0.99 | 75.0 | 5.3 |
| 5 | 2.9 | 1.09 | 73.1 | 5.2 |
| 6 | 2.9 | 1.10 | 72.8 | 5.0 |
| 7 | 3.4 | 1.08 | 72.3 | 5.2 |
| 8 | 3.7 | 1.09 | 69.9 | 4.9 |
| 9 | 4.1 | 1.05 | 68.8 | 4.7 |
| 10 | 3.8 | 1.03 | 67.8 | 4.7 |
| 11 | 4.1 | 1.05 | 65.1 | 4.5 |
| 12 | — | 1.10 | 63.0 | 4.3 |
| 13 | — | 1.05 | 53.1 | 3.7 |
| 14 | 0.7 | 0.33 | 39.2 | 2.8 |

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method of making a ceramic article, the method comprising:
    compounding ceramic precursor batch components, the ceramic precursor batch components comprising hydrous clay,
    wherein the hydrous clay comprises particle components having a platy geometry,
    wherein the crystallite size of the particle components having the platy geometry is less than a predetermined amount, and
    wherein the crystallite size of the particle components is the shortest dimension that the hydrous clay component extends in the basal plane direction and the crystallite size is less than about 66 nanometers.

2. The method of claim 1, wherein the method further comprises determining the crystallite size of the particle components having the platy geometry prior to compounding hydrous clay with other ceramic precursor batch components.

3. The method of claim 2, wherein determining the crystallite size of the particle components having the platy geometry comprises using an x-ray diffraction technique.

4. The method of claim 2, wherein if the crystallite size of the particle components having the platy geometry is determined to be above a predetermined amount, the method further comprises compounding additional particle components having the platy geometry and a crystallite size that is some amount lower than the predetermined amount, such that, collectively, the particle components having the platy geometry have a crystallite size that is less than the predetermined amount.

5. The method of claim 1, wherein the ceramic precursor batch components comprise at least 10% hydrous clay by weight.

6. The method of claim 1, wherein the crystallite size of the particle components having the platy geometry is between 20 and 66 nanometers.

7. The method of claim 1, wherein the ceramic precursor batch components comprise at least 15% hydrous clay by weight.

8. The method of claim 1, wherein the method further comprises extruding the compounded ceramic precursor batch components into a green body and firing the green body into a ceramic article.

9. The method of claim 8, wherein the ceramic article exhibits a coefficient of thermal expansion (23° C. to 800° C.) of less than $4.7 \times 10^{-7}/°$ C.

10. The method of claim 8, wherein firing the green body into a ceramic article comprises subjecting the green body to a firing schedule that comprises heating from a temperature of 800° C. to 1,000° C. at an average rate of no greater than 15° C. per hour.

11. A ceramic precursor batch composition, comprising:
    ceramic precursor batch components, the ceramic precursor batch components comprising hydrous clay,
    wherein the hydrous clay comprises particle components having a platy geometry,
    wherein the crystallite size of the particle components having the platy geometry is less than a predetermined amount, and
    wherein the crystallite size of the particle components is the shortest dimension that the hydrous clay component extends in the basal plane direction and the crystallite size is less than about 66 nanometers.

12. The ceramic precursor batch composition of claim 11, wherein the ceramic precursor batch components comprise at least 10% hydrous clay by weight.

13. The ceramic precursor batch composition of claim 11, wherein the ceramic precursor batch components comprise at least 15% hydrous clay by weight.

14. A green cellular ceramic body, comprising:
    ceramic precursor batch components, the ceramic precursor batch components comprising hydrous clay,
    wherein the hydrous clay comprises particle components having a platy geometry,
    wherein the crystallite size of the particle components having the platy geometry is less than a predetermined amount, and
    wherein the crystallite size of the particle components is the shortest dimension that the hydrous clay component extends in the basal plane direction and the crystallite size is less than about 66 nanometers.

15. The green cellular ceramic body of claim 14, wherein the ceramic precursor batch components comprise at least 10% hydrous clay by weight.

16. The green cellular ceramic body of claim 14, wherein the crystallite size of the particle components having the platy geometry is between 20 and 66 nanometers.

17. The green cellular ceramic body of claim 14, wherein the ceramic precursor batch components comprise at least 15% hydrous clay by weight.

* * * * *